United States Patent
Tak (10) Patent No.: US 7,352,431 B2
(45) Date of Patent: Apr. 1, 2008

(54) LIQUID CRYSTAL DISPLAY AND MANUFACTURING METHOD THEREOF

(75) Inventor: Young-Mi Tak, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/595,172

(22) Filed: Nov. 9, 2006

(65) Prior Publication Data

US 2007/0052888 A1 Mar. 8, 2007

Related U.S. Application Data

(62) Division of application No. 10/898,075, filed on Jul. 23, 2004, now Pat. No. 7,136,122.

(30) Foreign Application Priority Data

Jul. 24, 2003 (KR) ............................. 2003-50930

(51) Int. Cl.
*G02F 1/13* (2006.01)
*G03F 7/00* (2006.01)
(52) U.S. Cl. .................. 349/187; 349/110; 438/30

(58) Field of Classification Search ................ 349/187, 349/110; 430/30
See application file for complete search history.

(56) References Cited

U.S. PATENT DOCUMENTS

| | | | | |
|---|---|---|---|---|
| 6,335,148 | B2 * | 1/2002 | Lee et al. | 430/316 |
| 6,862,055 | B2 | 3/2005 | Park | |
| 2002/0033927 | A1 * | 3/2002 | Mun et al. | 349/156 |
| 2002/0142505 | A1 * | 10/2002 | Hwang et al. | 438/30 |
| 2004/0145686 | A1 | 7/2004 | Yoo et al. | |

* cited by examiner

*Primary Examiner*—Toan Ton
(74) *Attorney, Agent, or Firm*—MacPherson Kwok Chen & Heid LLP (57) ABSTRACT

A method of manufacturing a liquid crystal display panel is provided, which includes: coating a negative organic photoresist on a substrate; performing divisional light exposure with a plurality of shots including first and second shots adjacent to each other; and developing the photoresist to form a light blocking member having a plurality of openings, wherein the first and the second shots have a boundary crossing the openings.

10 Claims, 6 Drawing Sheets

Stitch area

LIQUID CRYSTAL DISPLAY AND MANUFACTURING METHOD THEREOF

CROSS-REFERENCE TO RELATED APPLICATIONS

This application is a divisional of U.S. patent application Ser. No. 10/898,075 filed Jul. 23, 2004 now U.S. Pat. No. 7,136,122 by TAK, Young-Mi, entitled "LIQUID CRYSTAL DISPLAY AND MANUFACTURING METHOD THEREOF," incorporated herein by reference, which application claims priority of Korean Patent Application No. 2003-50930 filed Jul. 24, 2003.

BACKGROUND OF THE INVENTION (a) Field of the Invention

The present invention relates to a liquid crystal display and a manufacturing method of a liquid crystal display.

(b) Description of Related Art

A display device such as a liquid crystal display (LCD) includes a plurality of pixels arranged in a matrix, and each pixel includes a transparent pixel electrode for displaying images. The pixel electrodes are driven by signals from signal lines including gate lines and data lines that intersect each other to define pixel areas and are connected to the pixel electrodes through switching elements such as thin film transistors (TFTs). The switching elements controls data signals from the data lines in response to scanning signals from the gate lines.

The LCD includes a TFT array panel including the signal lines, the pixel electrodes, and the TFTs and a common electrode panel including a common electrode facing the pixel electrodes and a black matrix having openings facing the pixel areas.

When a display area on a backplane for LCDs is too large to use an exposure mask, the entire exposure is accomplished by repeating a divisional exposure called step-and-repeat process. One divisional exposure unit or area is called a shot. Since transition, rotation, distortion, and etc. are generated during light exposure, the shots are not aligned accurately. Accordingly, parasitic capacitances generated between wires and pixel electrodes differ depending on the shots, and this causes the bright difference between the shots, which is recognized at the pixels located at a boundary between the shots. Therefore, the stitch defect is generated on the screen of the LCD due to brightness discontinuity between the shots.

In particular, a black matrix made of organic material, including black pigments, and having negative photosensitivity, which is also formed by divisional exposure, may cause stitch defects such as spots on an image. It is because the negative photosensitive organic material has different morphology depending on the number of the exposure to light. In detail, the boundaries of the shots overlap each other in consideration of alignment margin, and thus the portions of the negative photosensitive material on the boundaries of adjacent shots are twice exposed to light, while other portions within the shots are only once exposed to light. Therefore, the twice-exposed portions of the light blocking member have different morphology from other portions and this morphological difference cause different optical property, thereby yielding spots.

SUMMARY OF THE INVENTION

A motivation of the present invention is to solve problems of conventional arts.

A method of manufacturing a liquid crystal display panel is provided, which includes: coating a negative organic photoresist on a substrate; performing divisional light exposure with a plurality of shots including first and second shots adjacent to each other; and developing the photoresist to form a light blocking member having a plurality of openings, wherein the first and the second shots have a boundary crossing the openings.

The method may further include: preparing a stitch area that is disposed near the boundary of the first and the second shots and includes a plurality of stitch cells, each stitch cell being light-exposed in one of the first and the second shots and light-blocked in the other of the first and the second shots.

The number of the light-exposed stitch cells or the light-blocked stitch cells is preferably gradually decreasing or increasing along a direction from the first shot to the second shot.

Each of the stitch cells may include a pixel area, a plurality of pixel areas, or a portion of a pixel area.

The stitch cells may have boundaries crossing the openings and each of the stitch cells may have boundaries crossing at least two of the openings.

A method of manufacturing a liquid crystal display panel by a divisional exposure with a plurality of shots including first and second shots adjacent to each other is provided, which includes: coating a negative organic photoresist on a substrate; preparing a stitch area that is disposed near the boundary of the first and the second shots and includes a plurality of stitch cells; performing the first and the second shots in sequence; and developing the photoresist to form a light blocking member having a plurality of openings, wherein each stitch cell is light-exposed in one of the first and the second shots and light-blocked in the other of the first and the second shots, and the stitch cells have boundaries crossing the openings.

The number of the light-exposed stitch cells or the light-blocked stitch cells may be gradually decreasing or increasing along a direction from the first shot to the second shot.

Each of the stitch cells may include a pixel area, a plurality of pixel areas, or a portion of a pixel area.

Each of the stitch cells may have boundaries crossing at least two of the openings.

A liquid crystal display is provided, which includes: a first panel including a plurality of opaque members and transparent members; and a second panel including a light blocking member that is made of a negative photoresist and includes first and second portions subjected to different number of light exposure, the second portion facing the opaque members.

The first portion of the light blocking member may be disposed around the second portion to form edges of the light blocking member.

The second portion of the light blocking member may extend along a shape of the light blocking member.

The light blocking member may be wider than the opaque members.

The first portion of the light blocking member may be once exposed to light and the second portion of the light blocking member may be twice exposed to light.

The transparent members may include a plurality of pixel electrodes and the opaque members may include a plurality of signal lines transmitting signals to the pixel electrodes.

The light blocking member may have a plurality of openings facing the pixel electrodes.

The opaque members may further include a plurality of thin film transistors connected to the pixel electrodes and the signal lines comprises a plurality of gate lines and data lines connected to the thin film transistors.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

The present invention now will be described more fully hereinafter with reference to the accompanying drawings, in which embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Then, liquid crystal displays and manufacturing methods thereof according to embodiments of the present invention will be described with reference to accompanying drawings.

Figure 1:
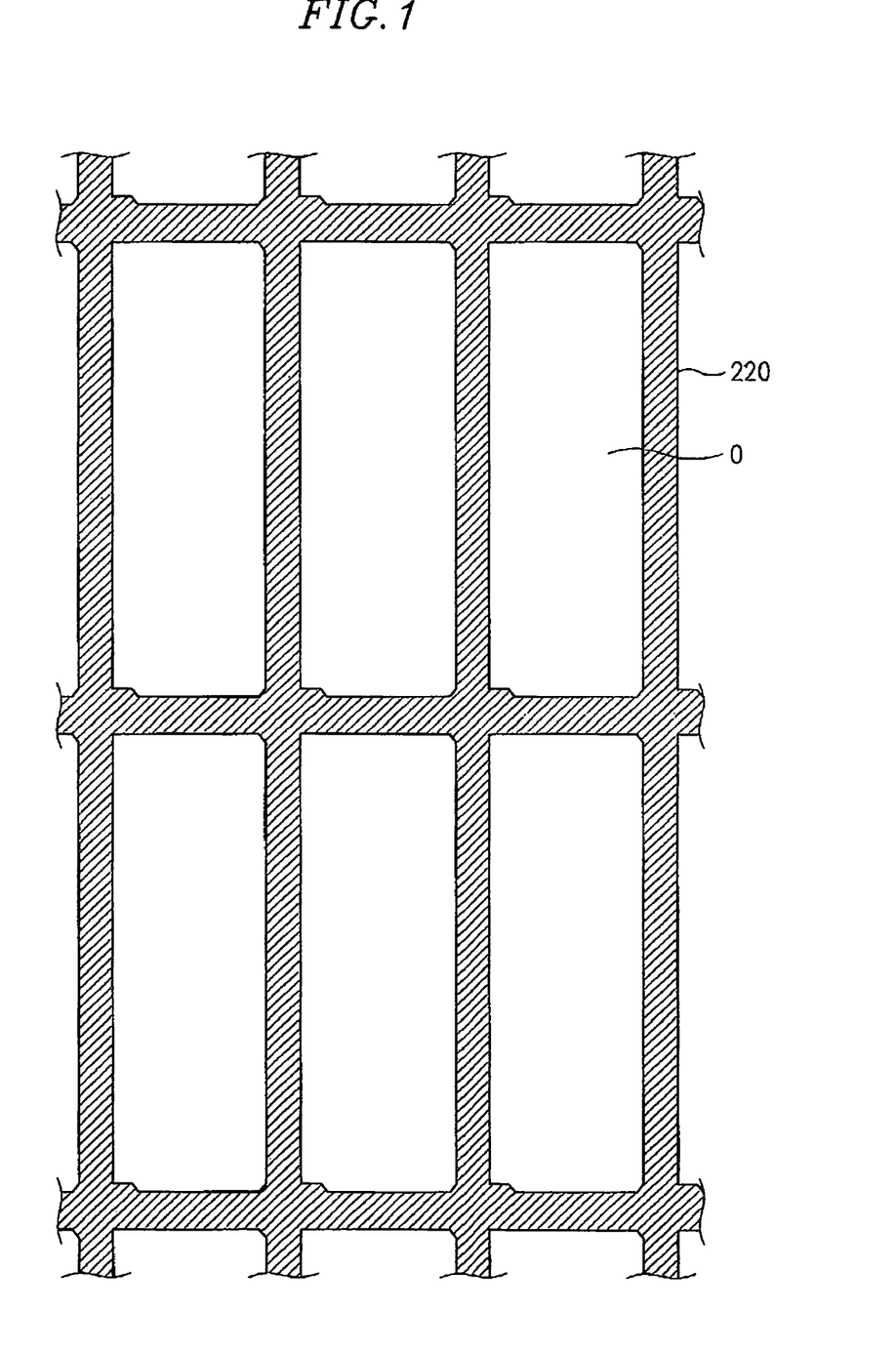
FIG. 1 is a layout view of an LCD panel according to an embodiment of the present invention.
Figure 2:
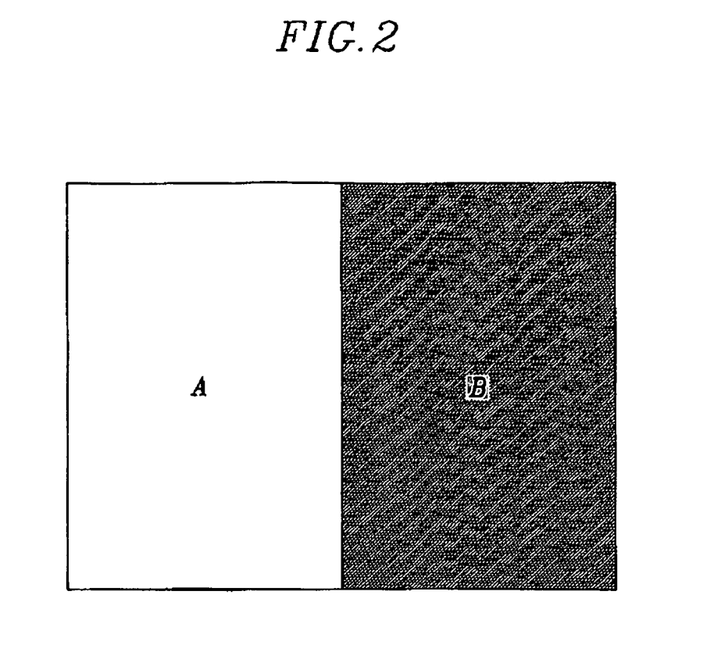
FIG. 2 is a plan view showing a stitch area between adjacent shots of an LCD panel according to an embodiment of the present invention.
Figure 3:
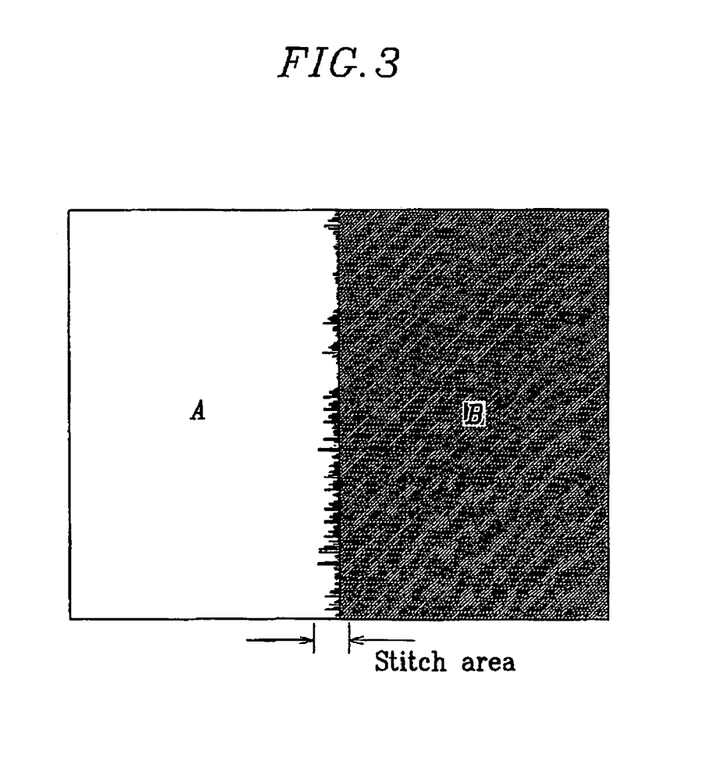
FIG. 3 is a plan view showing a stitch area between adjacent shots of an LCD panel according to another embodiment of the present invention.
Figure 4:
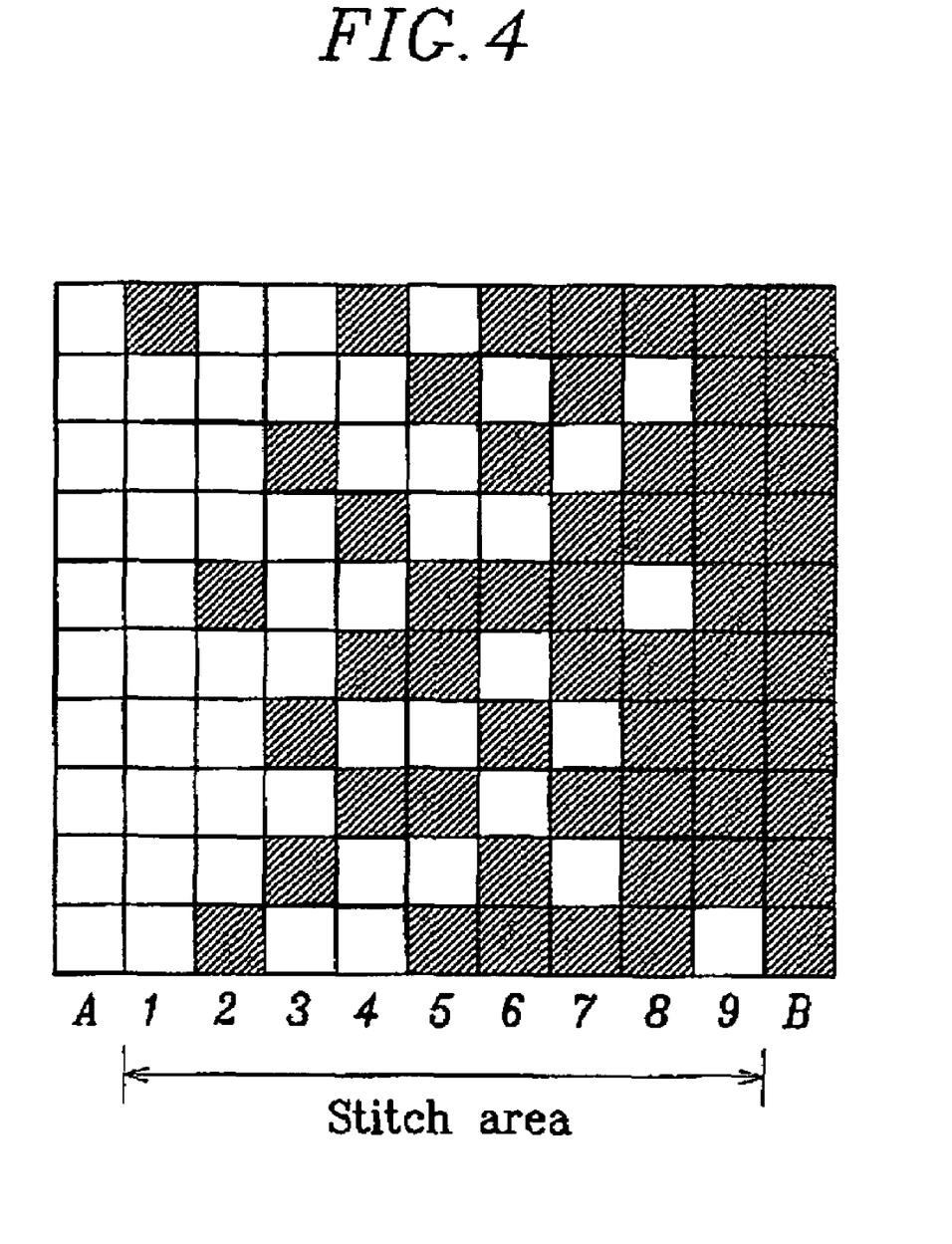
FIG. 4 is a plan view showing a stitch area which is a boundary area between shots of an LCD according to an embodiment of the present invention.
Figure 5:
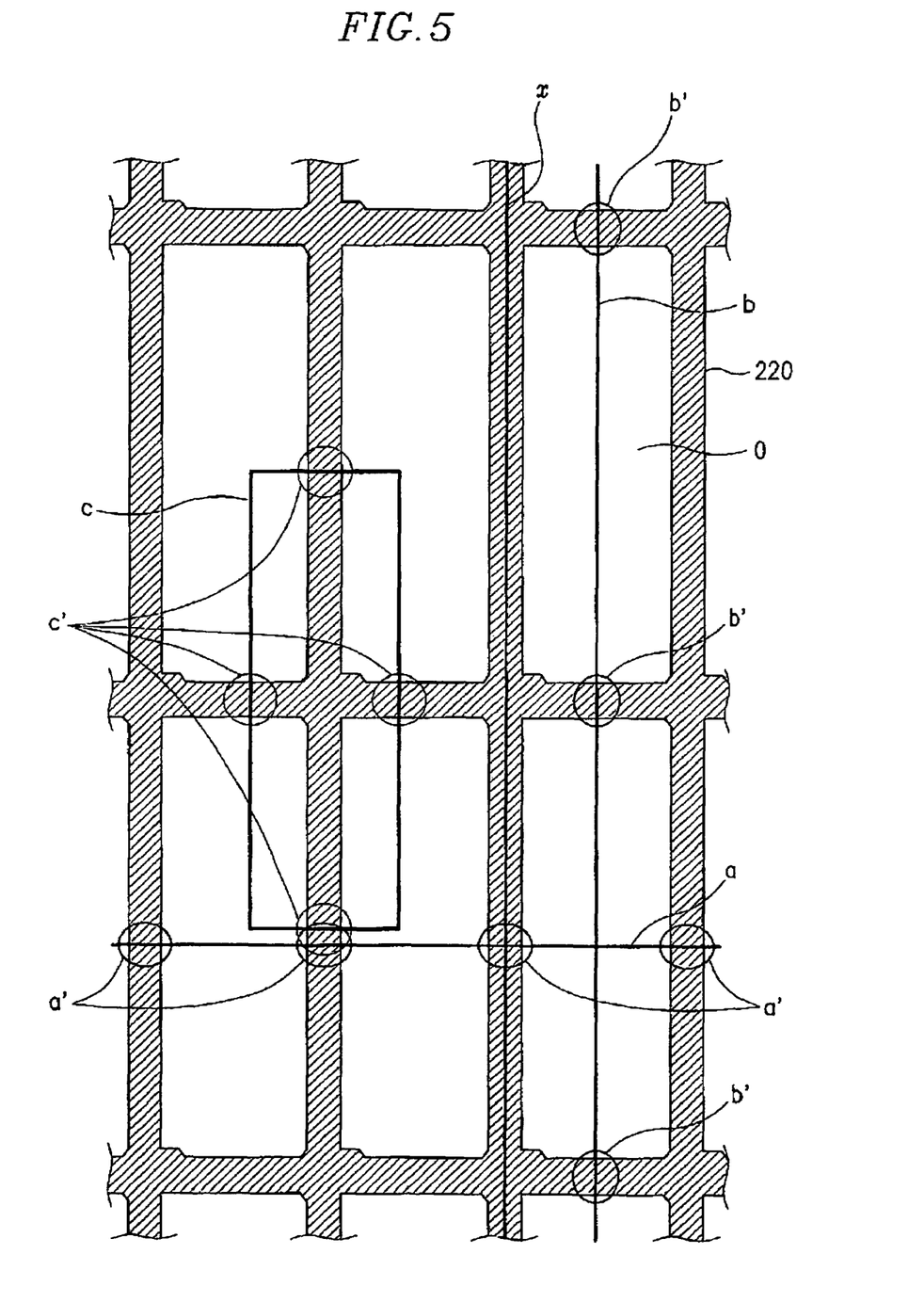
FIG. 5 illustrates boundaries of adjacent shots and a stitch cell according to an embodiment of the present invention.

FIG. 1 is a layout view of an LCD panel according to an embodiment of the present invention, FIG. 2 is a plan view showing a stitch area between adjacent shots of an LCD panel according to an embodiment of the present invention, FIG. 3 is a plan view showing a stitch area between adjacent shots of an LCD panel according to another embodiment of the present invention, FIG. 4 is a plan view showing a stitch area which is a boundary area between shots of an LCD according to an embodiment of the present invention, and FIG. 5 illustrates boundaries of adjacent shots and a stitch cell according to an embodiment of the present invention.

Referring to FIG. 1, an LCD panel according to this embodiment includes a light blocking member 220 also referred to as a black matrix, which has a plurality of openings O defining pixel areas. The light blocking member 220 blocks light leakage between adjacent pixel areas.

The light blocking member 220 is manufactured by coating a negative photoresist film (not shown) containing black pigments on an insulating substrate (not shown), performing light exposure with an exposure mask having light blocking areas and light transmitting areas, and developing the photoresist film. Portions of the photoresist film facing the light blocking areas are removed to form the openings O, while portions of the photoresist film facing the light transmitting areas are remained to form the light blocking layer 220.

When the size of a display area of the LCD panel, which includes a plurality of pixel areas, is larger than the size of the exposure mask, the display area is subject to a divisional exposure with step and repeat process. The active area is exposed by a plurality of shots such as the shots A and B shown in FIG. 2.

In addition, an overlapping area between two adjacent shots A and B is provided in consideration of alignment margin. Then, some portions of the photoresist film in the overlapping area are twice exposed to light. Since the negative organic photoresist repeatedly changes its material property such as optical density depending on the number of the exposure to the light, the light transmittances of once-exposed portions and twice-exposed portions may be different to cause spots on images.

FIG. 5 shows boundary lines a and b of adjacent shots that cross the openings O for minimizing the twice-exposed portions. Comparing a boundary line denoted by x, the length a' and b' of the boundary lines a and b meeting the light blocking film 220 that is exposed to light is very short. On the contrary, the boundary line x extending along the light blocking film 220 may cause a very long twice-exposed portion.

In the meantime, the overlapping area is configured as a stitch area as shown in FIG. 3. In the stitch area, light-blocked areas or light-exposed areas in the left shot A do not overlap those in the right shot B. The stitch area is divided into a plurality of stitch cells, each of which forms a light-blocked area or a light-exposed area, and the light-blocked areas and the light-exposed areas are exchanged in the shots A and B. For example, the stitch area may be divided into a plurality of stitch cells arranged in an N×M (where M and N are natural numbers) matrix as shown in FIG. 4.

FIG. 4 illustrates an arrangement of the light-blocked areas and the light-exposed areas in the left shot A and in the right shot B, respectively. The white areas represent the light-exposed areas, while the black areas represent the light-blocked areas.

As shown in FIG. 4, a righter column includes more light-exposed areas in the left shot A, while it includes less light-exposed areas in the right shot B.

A pixel area may include one or more stitch cells or a stitch cell includes a plurality of pixel areas. The reduced size of the stitch cell may be more effective for preventing a mosaic pattern from being recognized.

FIG. 5 shows an exemplary stitch cell c having edges crossing the openings O. Then, a pixel area consists of quarters of four stitch cells and the pixel area closer to the shot B includes more stitch cells belong to the shot B. However, the stitch cell may include only a portion of a pixel, or may include at least one pixel.

If there is no stitch area, adjacent two shots A and B are aligned such that the openings O on the boundary of the two shots A and B are smaller or larger than those within the two shots A and B. However, if the stitch area c is configured as shown in FIG. 5, the size of the openings O are gradually varied from left to right in the stitch area and the difference in the luminance at the boundary of the two shots A and B may not be perceived.

An LCD according to another embodiment of the present invention is described in detail with reference to FIGS. 6 and 7.

Figure 6:
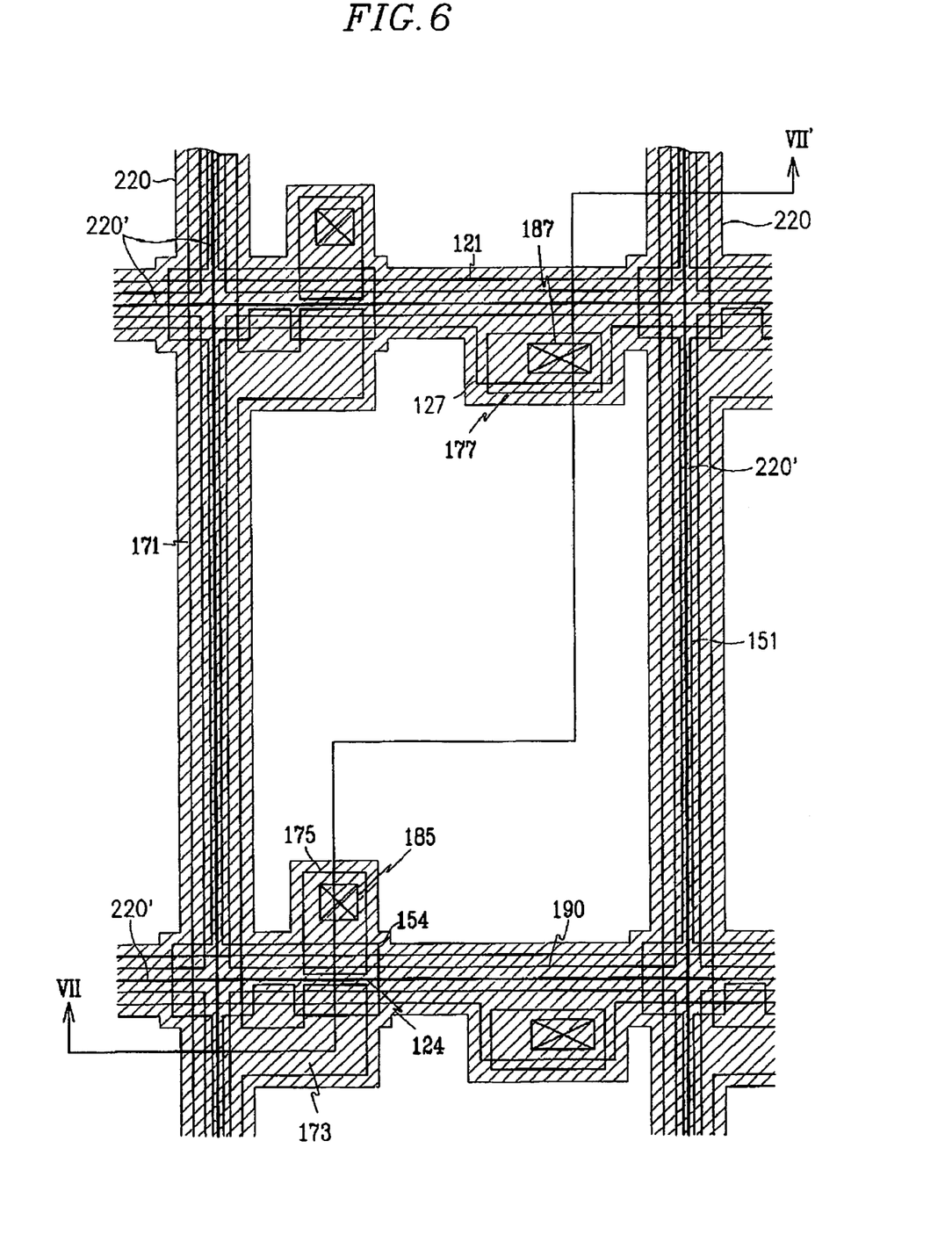
FIG. 6 is a layout view of an LCD according to an embodiment of the present invention.
Figure 7:
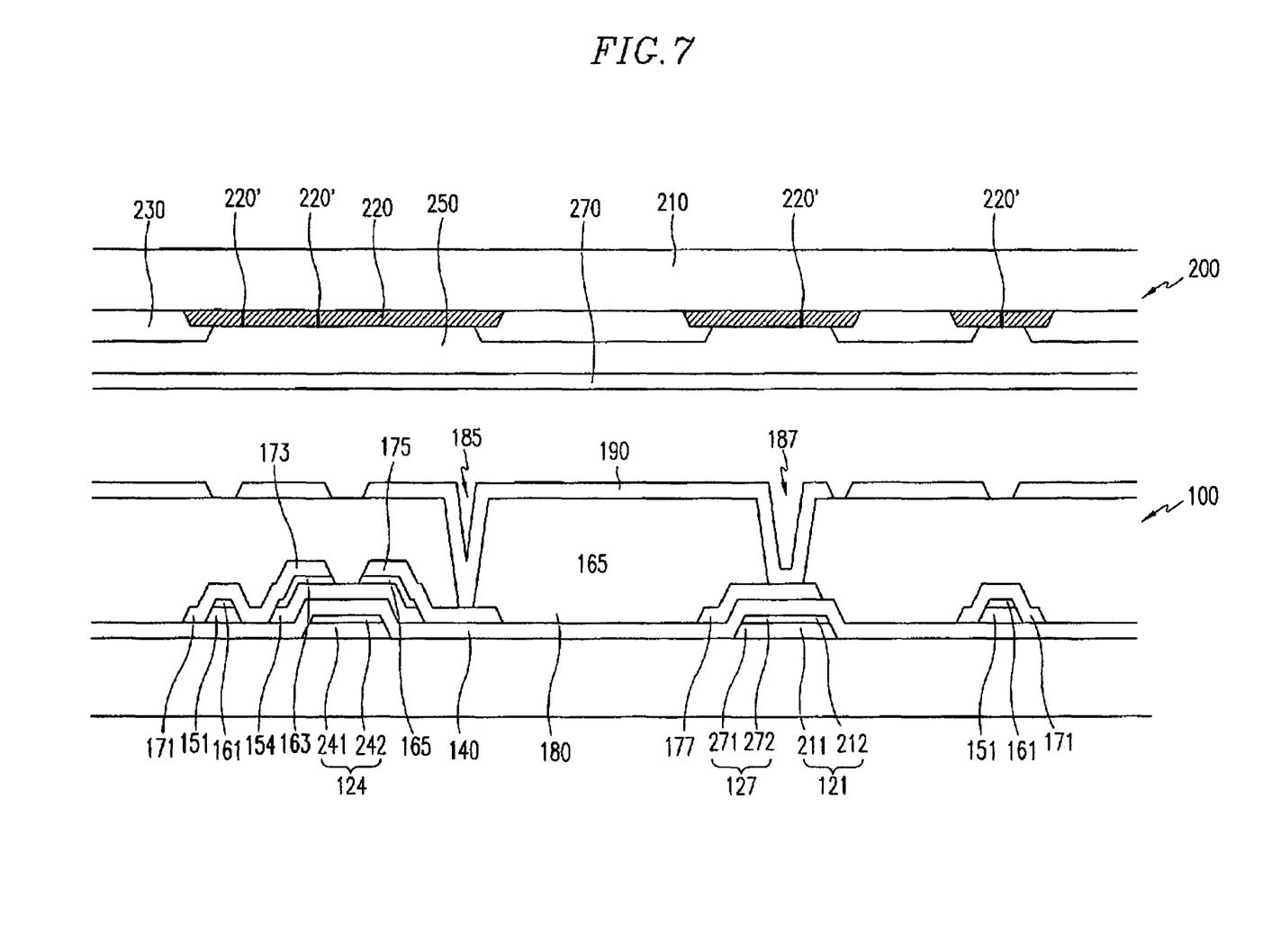
FIG. 7 is a sectional view of the LCD shown in FIG. 6 taken along the line VII-VII'.

FIG. 6 is a layout view of an LCD according to an embodiment of the present invention, and FIG. 7 is a sectional view of the LCD shown in FIG. 6 taken along the line VII-VII'.

An LCD according to an embodiment of the present invention includes a TFT array panel 100, a common electrode panel 200 facing the TFT array panel 100 with a predetermined gap, and a liquid crystal (LC) layer (not shown) filled in the gap between the TFT array panel 100 and the common electrode panel 200. Alignment layers (not shown) for aligning LC molecules in the LC layer may be coated on inner surfaces of the panels 100 and 200.

Regarding the TFT array panel 100, a plurality of gate lines 121 for transmitting gate signals are formed on an insulating substrate 110. Each gate line 121 extends substantially in a transverse direction and a plurality of portions of each gate line 121 form a plurality of gate electrodes 124. Each gate line 121 includes a plurality of expansions 127 protruding downward.

The gate lines 121 include two films having different physical characteristics, a lower film and an upper film. The upper film is preferably made of low resistivity metal including Al containing metal such as Al and Al alloy for reducing signal delay or voltage drop in the gate lines 121. On the other hand, the lower film is preferably made of material such as Cr, Mo and Mo alloy having good contact characteristics with other materials such as ITO (indium tin oxide) or IZO (indium zinc oxide). A good exemplary combination of the lower film material and the upper film material is Cr and Al—Nd alloy. In FIG. 7, the lower and the upper films of the gate electrodes 124 are indicated by reference numerals 241 and 242, respectively, and the lower and the upper films of the expansion 127 are indicated by reference numerals 271 and 272, respectively. The lateral sides of the upper film and the lower film are inclined relative to a surface of the substrate 110, and the inclination angle thereof ranges about 30-80 degrees.

A gate insulating layer 140 preferably made of silicon nitride (SiNx) is formed on the gate lines 121.

A plurality of semiconductor stripes 151 preferably made of hydrogenated amorphous silicon (abbreviated to "a-Si") are formed on the gate insulating layer 140. Each semiconductor stripe 151 extends substantially in a longitudinal direction and has a plurality of projections 154 branched out toward the gate electrodes 124. The width of each semiconductor stripe 151 becomes large near the gate lines 121 such that the semiconductor stripe 151 covers large areas of the gate lines 121.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are tapered, and the inclination angles thereof are preferably in a range between about 30-80 degrees.

A plurality of data lines 171, a plurality of drain electrodes 175, and a plurality of storage capacitor conductors 177 are formed on the ohmic contacts 161 and 165 and the gate insulating layer 140.

The data lines 171 for transmitting data voltages extend substantially in the longitudinal direction and intersect the gate lines 121. A plurality of branches of each data line 171, which project toward the drain electrodes 175, form a plurality of source electrodes 173. Each drain electrode 175 is separated from the data lines 171 and disposed opposite a source electrode 173 with respect to a gate electrode 124. A gate electrode 123, a source electrode 173, and a drain electrode 175 along with a projection 154 of a semiconductor stripe 151 form a TFT having a channel formed in the projection 154 disposed between the source electrode 173 and the drain electrode 175.

The storage capacitor conductors 177 overlap the expansions 127 of the gate lines 121.

The data lines 171, the drain electrodes 175, and the storage capacitor conductors 177 include a conductive film preferably made of Mo, Mo alloy, Cr, Al or Al alloy. However, they may have triple-layered structure including (1) Mo or Mo ally, (2) Al, and (3) Mo or Mo alloy.

Like the gate lines 121, the data lines 171, the drain electrodes 175, and the storage capacitor conductors 177 have tapered lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines as described above, to smooth the profile of the surface, thereby preventing the disconnection of the data lines 171.

A passivation layer 180 is formed on the data lines 171, the drain electrodes 175, the storage conductors 177, and the exposed portions of the semiconductor stripes 151. The passivation layer 180 is preferably made of photosensitive organic material having a good flatness characteristic or low dielectric insulating material such as a-Si:C:O and a-Si:O:F formed by plasma enhanced chemical vapor deposition (PECVD). The passivation layer 180 may have a double-layered structure including an inorganic lower film preferably made of silicon nitride or silicon oxide and an organic upper film such that the exposed portions of the semiconductor stripes 151 do not contact organic material.

The passivation layer 180 has a plurality of contact holes 185 and 187 exposing the drain electrodes 175 and the storage conductors 177, respectively.

A plurality of pixel electrodes 190, which are preferably made of transparent conductive material such as ITO and IZO or reflective conductive material such as Al and Ag, are formed on the passivation layer 180.

The pixel electrodes 190 are physically and electrically connected to the drain electrodes 175 through the contact holes 185 and to the storage capacitor conductors 177 through the contact holes 187 such that the pixel electrodes 190 receive the data voltages from the drain electrodes 175 and transmit the received data voltages to the storage capacitor conductors 177. The pixel electrodes 190 supplied with the data voltages generate electric fields in cooperation with a common electrode (270) on the common electrode panel 200, which reorient LC molecules in the LC layer disposed therebetween.

The pixel electrode 190 and the common electrode form a LC capacitor $C_{LC}$, which stores applied voltages after turn-off of the TFT Q. An additional capacitor called a "storage capacitor," which is connected in parallel to the LC capacitor $C_{LC}$, is provided for enhancing the voltage storing capacity. The storage capacitors are implemented by overlapping the pixel electrodes 190 with the gate lines 121 adjacent thereto (called "previous gate lines"). The capacitances of the storage capacitors, i.e., the storage capacitances are increased by providing the expansions 127 at the gate lines 121 for increasing overlapping areas and by providing the storage capacitor conductors 177, which are connected to the pixel electrodes 190 and overlap the expansions 127, under the pixel electrodes 190 for decreasing the distance between the terminals. Otherwise, a storage electrode (not shown) that is preferably made of the same layer as the gate lines 121 and overlaps the pixel electrode 190 may be added.

The pixel electrodes 190 overlap the gate lines 121 and the data lines 171 to increase aperture ratio but it is optional.

The common electrode panel 200 facing the TFT array panel 100 includes an insulating substrate 210 preferably made of transparent glass, a light blocking member 220 that has a plurality of openings facing the pixel electrodes 190 and preferably made of negative organic material or light blocking material, a plurality of red, green and blue color filters 230 disposed substantially in the openings defined by the light blocking member 220, an overcoat 250 formed on the color filters 230 and the light blocking member 220, and a common electrode 270 formed on the overcoat 250 and preferably made of transparent conductor such as ITO and IZO.

According a method of manufacturing the LCD 100 shown in FIGS. 6 and 7, the light blocking member 220 is formed by coating, light-exposing, and developing an organic photoresist film (not shown) using a divisional light exposure. At this time, a stitch cell is obtained by dividing a pixel into left and right halves or upper and lower halves. Otherwise, one or more pixel area may serve as a stitch cell. Then, boundaries of the stitch cell correspond to center lines of the light blocking member 220 spaced apart from edges of the light blocking member 220 and thus the twice-exposed portions 220' of the photoresist film form central portions of the light blocking member 220 rather than edges portions thereof.

The TFT array panel 100 and the common electrode panel 200 are aligned and assembled with a gap therebetween and liquid crystal is injected into the gap to form a LC layer. At this time, opaque members in the TFT array panel 100 such as the gate lines 121 and the data lines 171, which are narrower than the light blocking member 220, face the central portions of the light blocking member 220. In other words, the central, twice-exposed portions 220' of the light blocking member 220, which correspond to the boundaries of the stitch cells, face the gate lines 121 and the data lines 171. Accordingly, the distinguished transmittance of the twice-exposed portions 220' of the light blocking member 220 is covered by the gate lines 121 and the data lines, thereby preventing spots in an image.

The stitch area shown in FIG. 5 may be employed to the LCD shown in FIGS. 6 and 7.

The color filters 230 may be disposed on the TFT array panel 100 and, in this case, they are preferably located on or under the passivation layer 180.

As described above, the boundaries of the shots in a divisional exposure in a method of a panel for an LCD cross over openings of the light blocking member or twice exposed portions in boundaries of the light blocking member overlap the signal lines, thereby minimizing the stitch defect represented as spots.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of manufacturing a liquid crystal display panel, the method comprising:
   coating a negative organic photoresist on a substrate;
   performing divisional light exposure with a plurality of shots including first and second shots adjacent to each other; and
   developing the photoresist to form a light blocking member having a plurality of openings,
   wherein the first and the second shots have a boundary crossing the openings.

2. The method of claim 1, further comprising:
   preparing a stitch area that is disposed near the boundary of the first and the second shots and includes a plurality of stitch cells, each stitch cell being light-exposed in one of the first and the second shots and light-blocked in the other of the first and the second shots.

3. The method of claim 2, wherein the number of the light-exposed stitch cells or the light-blocked stitch cells is gradually decreasing or increasing along a direction from the first shot to the second shot.

4. The method of claim 3, wherein each of the stitch cells includes a pixel area, a plurality of pixel areas, or a portion of a pixel area.

5. The method of claim 3, wherein the stitch cells have boundaries crossing the openings.

6. The method of claim 5, wherein each of the stitch cells has boundaries crossing at least two of the openings.

7. A method of manufacturing a liquid crystal display panel by a divisional exposure with a plurality of shots including first and second shots adjacent to each other, the method comprising:
   coating a negative organic photoresist on a substrate;
   preparing a stitch area that is disposed near the boundary of the first and the second shots and includes a plurality of stitch cells;
   performing the first and the second shots in sequence; and
   developing the photoresist to form a light blocking member having a plurality of openings,
   wherein each stitch cell is light-exposed in one of the first and the second shots and light-blocked in the other of the first and the second shots, and the stitch cells have boundaries crossing the openings.

8. The method of claim 7, wherein the number of the light-exposed stitch cells or the light-blocked stitch cells is gradually decreasing or increasing along a direction from the first shot to the second shot.

9. The method of claim 8, wherein each of the stitch cells includes a pixel area, a plurality of pixel areas, or a portion of a pixel area.

10. The method of claim 7, wherein each of the stitch cells has boundaries crossing at least two of the openings.

* * * * *